(12) United States Patent
Sakuma et al.

(10) Patent No.: US 9,541,397 B2
(45) Date of Patent: Jan. 10, 2017

(54) SENSOR DEVICE, AND ELECTRONIC APPARATUS

(71) Applicant: Seiko Epson Corporation, Tokyo (JP)

(72) Inventors: Masayasu Sakuma, Kamiina (JP); Yoshihiro Kobayashi, Komagane (JP); Shojiro Kitamura, Suwa (JP); Taketo Chino, Hokuto (JP); Nobuyuki Imai, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/982,700

(22) Filed: Dec. 29, 2015

(65) Prior Publication Data
US 2016/0109238 A1    Apr. 21, 2016

Related U.S. Application Data

(63) Continuation of application No. 13/543,098, filed on Jul. 6, 2012, now Pat. No. 9,250,260.

(30) Foreign Application Priority Data

Jul. 11, 2011   (JP) .................................. 2011-152731

(51) Int. Cl.
*G01P 15/00*   (2006.01)
*G01C 19/5783*   (2012.01)
(Continued)

(52) U.S. Cl.
CPC .............. *G01C 19/5783* (2013.01); *G01P 1/00* (2013.01); *G01P 15/02* (2013.01); *G01P 15/097* (2013.01); *G01P 15/18* (2013.01)

(58) Field of Classification Search
CPC ..... G01C 19/5783; G01P 15/097; G01P 15/18
(Continued)

(56) References Cited

U.S. PATENT DOCUMENTS 5,331,854 A * 7/1994 Hulsing, II ................. 73/514.37
6,216,537 B1 * 4/2001 Henschel et al. ............... 73/493
(Continued)

FOREIGN PATENT DOCUMENTS

CN   101109634 A   1/2008
CN   101170105 A   4/2008
(Continued)

*Primary Examiner* — Harshad R Patel
*Assistant Examiner* — Samir M Shah
(74) *Attorney, Agent, or Firm* — Harness, Dickey & Pierce, P.L.C.

(57) ABSTRACT

A sensor device includes a mounting board having a first rigid board on which an angular velocity sensor is mounted and a third rigid board on which an angular velocity sensor is mounted, and a pedestal for fixing the mounting board. Further, the pedestal includes a base section having a first fixation surface along an x axis and a y axis, and projecting sections disposed on the base section, and having a second fixation surface along the x axis and a z axis, and a third fixation surface along the y axis and the z axis, each of the rigid boards is supported by at least two of the first fixation surface, the second fixation surface, and the third fixation surface, and the angular velocity sensors have respective detection axes intersecting with each other.

11 Claims, 7 Drawing Sheets

(51) Int. Cl.
- *G01P 15/097* (2006.01)
- *G01P 15/18* (2013.01)
- *G01P 1/00* (2006.01)
- *G01P 15/02* (2013.01)

(58) Field of Classification Search
USPC ........................ 73/431, 488, 493, 510, 866.5
See application file for complete search history.

(56) References Cited

U.S. PATENT DOCUMENTS

| | | | |
|---|---|---|---|
| 6,738,721 | B1 | 5/2004 | Drucke et al. |
| 7,040,922 | B2 * | 5/2006 | Harney et al. ................ 439/527 |
| 7,291,023 | B1 | 11/2007 | Still et al. |
| 7,987,713 | B2 * | 8/2011 | Ota et al. ........................ 73/493 |
| 8,100,010 | B2 * | 1/2012 | Fly et al. ........................ 73/493 |
| 8,427,905 | B2 * | 4/2013 | Miyamoto et al. |
| 2003/0011980 | A1 * | 1/2003 | Albrecht et al. ............. 361/685 |
| 2003/0070483 | A1 * | 4/2003 | Mueller ........................... 73/493 |
| 2007/0170228 | A1 | 7/2007 | Zhao et al. |
| 2008/0100732 | A1 * | 5/2008 | Minamio et al. ............ 348/294 |
| 2008/0117324 | A1 * | 5/2008 | Minamio et al. ............ 348/340 |
| 2008/0144302 | A1 * | 6/2008 | Rosenblatt .................... 361/809 |
| 2008/0152272 | A1 * | 6/2008 | Debrailly et al. ............ 384/448 |
| 2009/0056446 | A1 * | 3/2009 | Cluff et al. ............. 73/514.16 |
| 2009/0095510 | A1 * | 4/2009 | Ono et al. ..................... 174/254 |
| 2009/0255335 | A1 * | 10/2009 | Fly et al. ........................ 73/493 |
| 2011/0162452 | A1 * | 7/2011 | Ono et al. ................. 73/514.01 |

FOREIGN PATENT DOCUMENTS

| | | |
|---|---|---|
| JP | 05-340960 A | 12/1993 |
| JP | 07-306047 A | 11/1995 |
| JP | 11-211481 A | 8/1999 |
| JP | 11-289141 A | 10/1999 |
| JP | 2001-102746 A | 4/2001 |
| JP | 2002-009228 A | 1/2002 |
| JP | 2005-197493 A | 7/2005 |
| JP | 2006-112856 A | 4/2006 |
| JP | 2006-145410 A | 6/2006 |
| JP | 2006-337196 A | 12/2006 |
| JP | 2010-267983 A | 11/2010 |
| JP | 2011-516898 A | 5/2011 |

* cited by examiner

SENSOR DEVICE, AND ELECTRONIC APPARATUS

CROSS-REFERENCE TO RELATED APPLICATIONS

This is a continuation application of U.S. application Ser. No. 13/543,098, filed Jul. 6, 2012, which claims priority to Japanese Patent Application No. 2011-152731, filed Jul. 11, 2011, both of which are expressly incorporated by reference herein in their entireties.

BACKGROUND

1. Technical Field

The present invention relates to a sensor device and an electronic apparatus.

2. Related Art

There is known such a sensor unit as disclosed in, for example, U.S. Pat. No. 7,040,922 (Document 1). The sensor unit described in Document 1 has a mounting member having a cuboid shape and three surfaces perpendicular to each other, and sensor devices mounted respectively on the three surfaces.

In the case of mounting such sensor devices on a circuit board or the like, it is difficult to mount the sensor devices directly on the circuit board, and the sensor devices are generally mounted in a condition of being housed in a casing composed of a pedestal and a lid member. However, if the sensor devices are housed in such a casing, there arises a problem of growth in size of the sensor devices. Further, if the sensor device is fixed obliquely to the casing, there also arises a problem that the detection axis of the sensor device is tilted to thereby degrade the detection accuracy. Therefore, the sensor devices downsizing of which can be achieved, and positioning of which is performed correctly have eagerly been desired.

SUMMARY

An advantage of the invention is to provide a sensor device and an electronic apparatus with which positioning of an electronic component can be performed with ease and accuracy while achieving downsizing.

An aspect of the invention is directed to a sensor device including a plurality of mounting boards on which a sensor component is mounted, and a pedestal adapted to fix each of the mounting boards, wherein when three axes perpendicular to each other are defined as a first axis, a second axis, and a third axis, respectively, the pedestal includes a base section having a first fixation surface along the first axis and the second axis, and a projecting section disposed on the base section, and having a second fixation surface along the third axis and the first axis, and a third fixation surface along the second axis and the third axis, each of the mounting boards is supported by at least two of the first fixation surface, the second fixation surface, and the third fixation surface, and the sensor components have respective detection axes intersecting with each other.

According to this configuration, it is possible to provide a sensor device with which positioning of an electronic component can be performed with ease and accuracy while achieving downsizing.

In the sensor device of the above aspect of the invention, it is preferable that at least one pair of the projecting sections are provided, and at least one of the mounting boards is supported by the pair of the projecting sections so that the sensor component is located between the pair of the projecting sections.

According to this configuration, it is possible to stably fix at least one mounting board to the pedestal while performing positioning.

In the sensor device of the above aspect of the invention, it is preferable that the base section is provided with a recessed section on the surface along the first axis and the second axis.

Thus, the downsizing can be achieved.

In the sensor device of the above aspect of the invention, it is preferable that the first fixation surface is disposed on a periphery of the recessed section.

According to this configuration, the mounting board can stably be fixed to the first fixation surface.

In the sensor device of the above aspect of the invention, it is preferable that the mounting board supported by the first fixation surface is supported so that a surface on which the sensor component is mounted faces to the recessed section.

According to this configuration, the sensor component can be housed in the recessed section to thereby achieve the downsizing of the device.

In the sensor device of the above aspect of the invention, it is preferable that the recessed section is filled with an infill.

According to this configuration, unwanted breakage of the sensor component can be prevented.

In the sensor device of the above aspect of the invention, it is preferable that the projecting section is located above the first fixation surface, and has a fourth fixation surface including the first axis and the second axis.

According to this configuration, since the two mounting boards can be disposed while overlapping in the third-axis direction, the downsizing of the device can be achieved.

In the sensor device of the above aspect of the invention, it is preferable that the plurality of mounting boards includes an analog circuit board having an analog circuit, and a digital circuit board having a digital circuit, and the analog circuit board is supported by one of the first fixation surface and the fourth fixation surface, and the digital circuit board is supported by the other of the first fixation surface and the fourth fixation surface.

According to this configuration, since the analog circuit and the digital circuit can be disposed with relatively large distance, transmission of the noise can be suppressed.

In the sensor device of the above aspect of the invention, it is preferable that the plurality of mounting boards are respectively connected by bendable connection sections.

According to this configuration, fixation of the mounting board becomes easier.

In the sensor device of the above aspect of the invention, it is preferable that the plurality of sensor components includes at least one of an angular velocity sensor and an acceleration sensor.

According to this configuration, the sensor device capable of detecting the angular velocity or the acceleration can be obtained.

Another aspect of the invention is directed to an electronic apparatus including the sensor device according to the above aspect of the invention.

According to this configuration, the electronic apparatus with high reliability can be obtained.

BRIEF DESCRIPTION OF THE DRAWINGS

The invention will now be described with reference to the accompanying drawings, wherein like numbers reference like elements.

DESCRIPTION OF AN EXEMPLARY EMBODIMENT

Hereinafter, a sensor device and an electronic apparatus according to the invention will be explained in detail based on an exemplary embodiment shown in the accompanying drawings.

1. Sensor Device

Figure 1A:
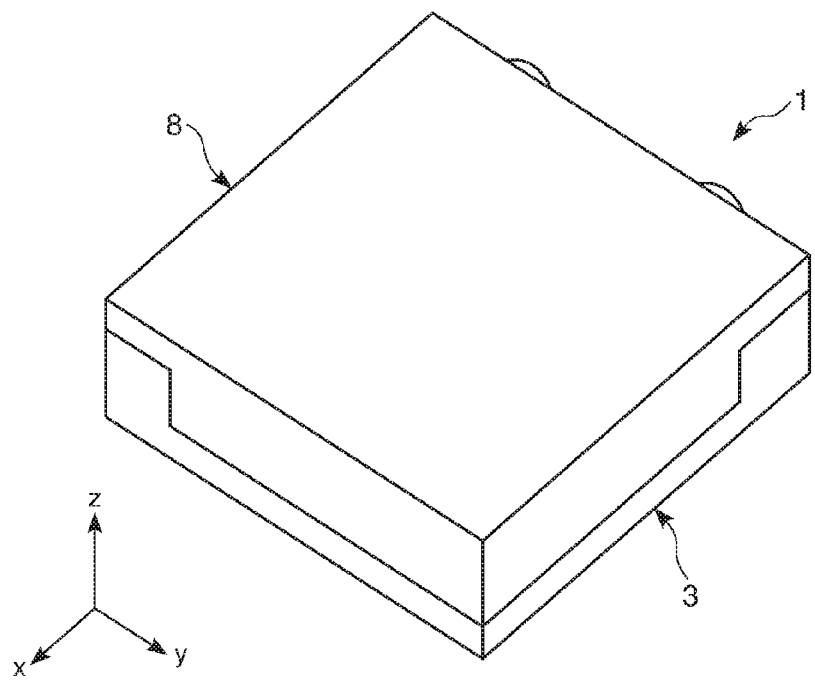
FIGS. 1A and 1B are perspective views showing a sensor device according to a preferred embodiment of the invention.
Figure 1B:
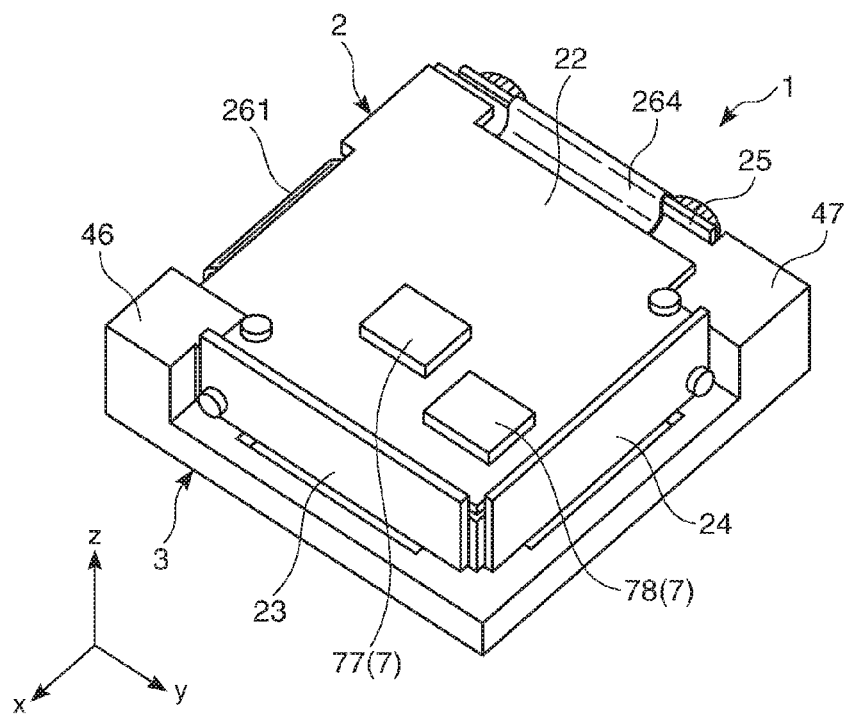
Figure 2A:
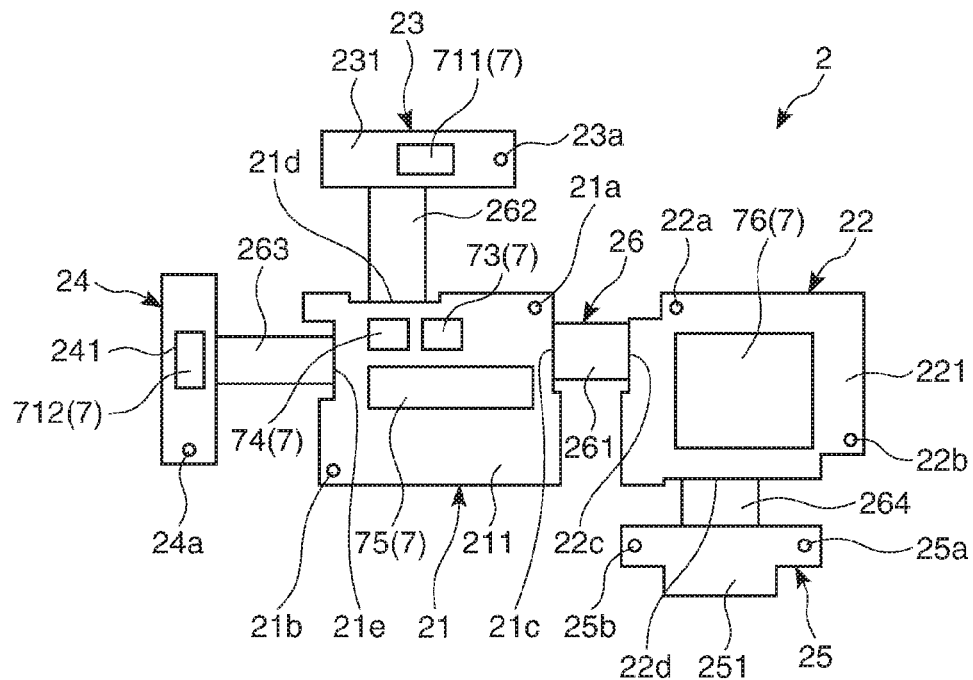
FIGS. 2A and 2B are development diagrams of a mounting board provided to the sensor device shown in FIGS. 1A and 1B.
Figure 2B:
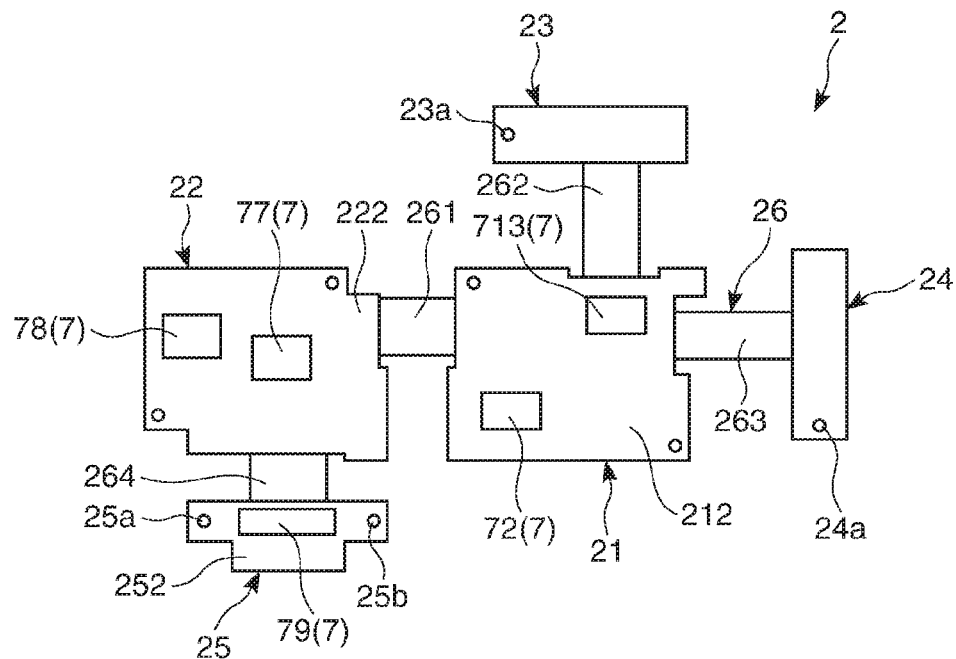
Figure 3:
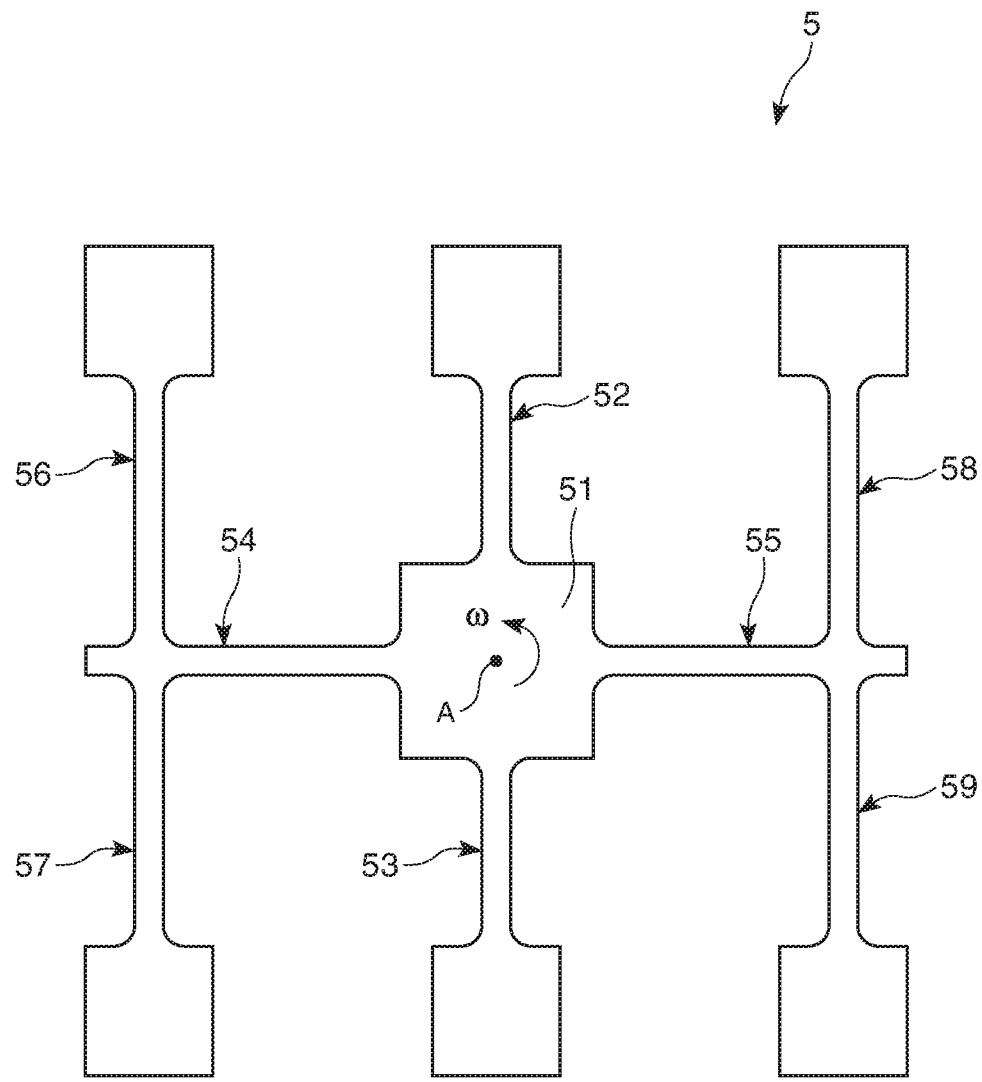
FIG. 3 is a plan view showing an example of an angular velocity sensor provided to the sensor device shown in FIGS. 1A and 1B.
Figure 4:
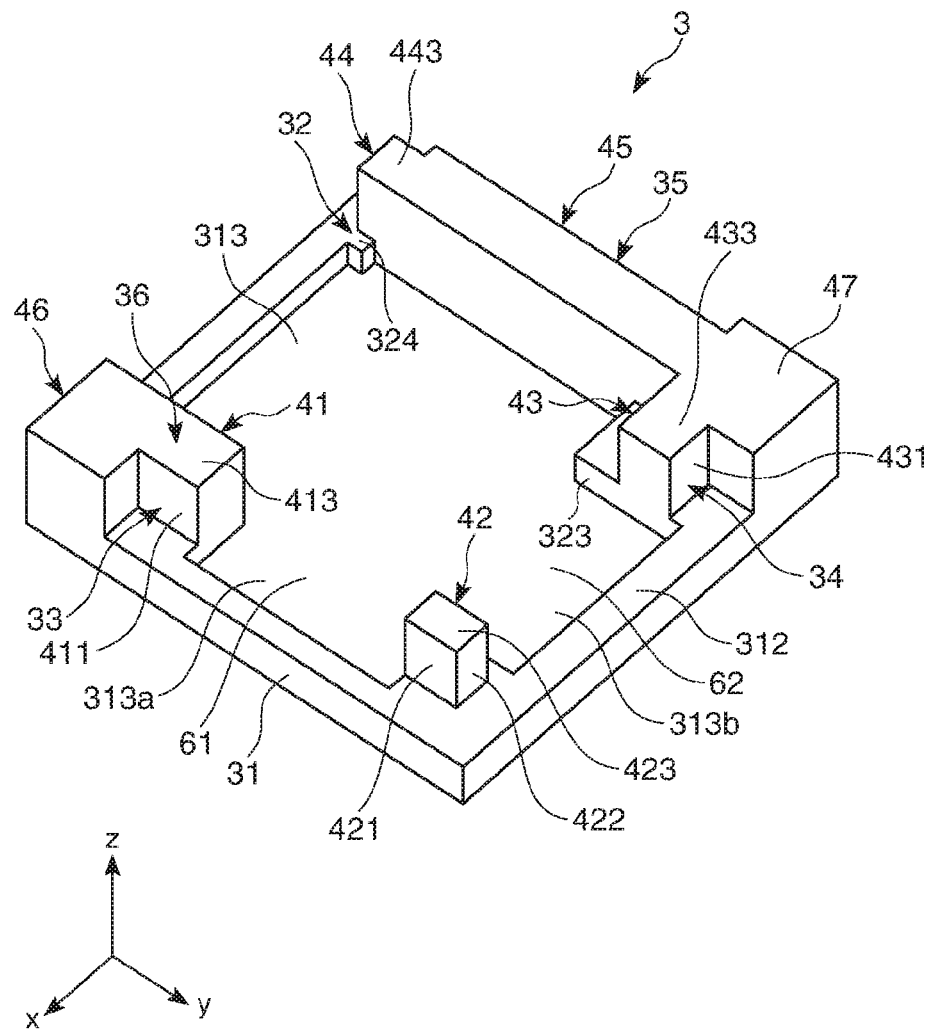
FIG. 4 is a perspective view of a pedestal provided to the sensor device shown in FIGS. 1A and 1B.
Figure 5:
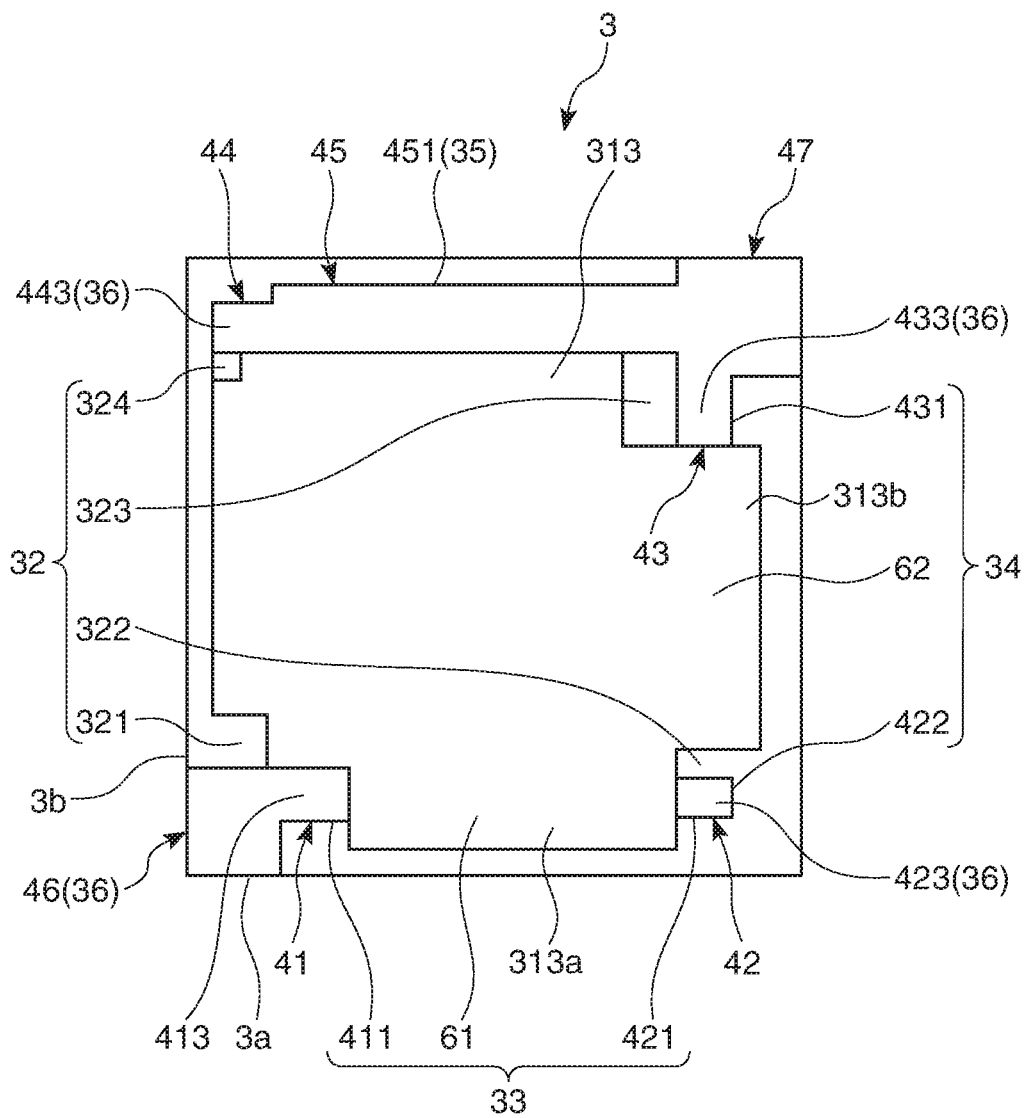
FIG. 5 is a plan view of the pedestal shown in FIG. 4.
Figure 6:
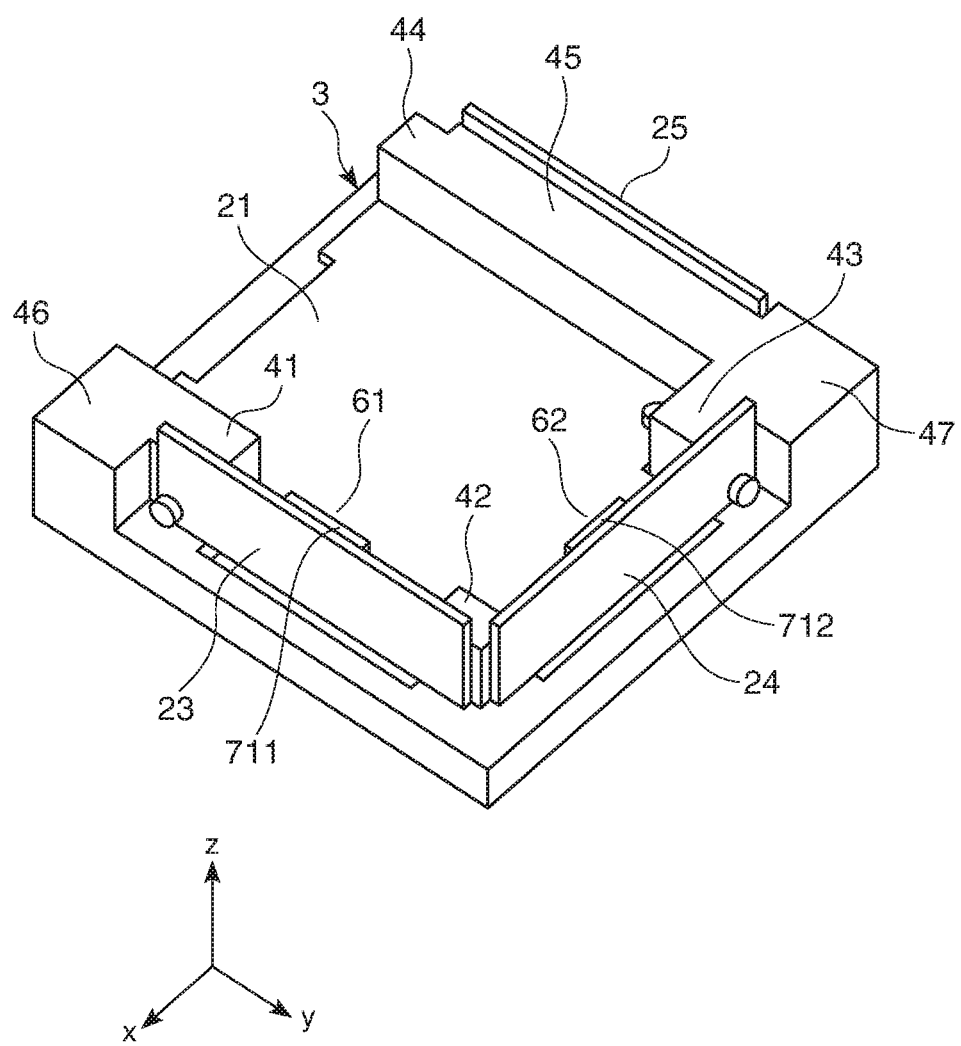
FIG. 6 is a perspective view showing the state of fixing the mounting board on the pedestal shown in FIG. 4.

FIGS. 1A and 1B are perspective views showing the sensor device according to an exemplary embodiment of the invention, FIGS. 2A and 2B are development diagrams of amounting board provided to the sensor device shown in FIGS. 1A and 1B, FIG. 3 is a plan view showing an example of an angular velocity sensor provided to the sensor device shown in FIGS. 1A and 1B, FIG. 4 is a perspective view of a pedestal provided to the sensor device shown in FIGS. 1A and 1B, FIG. 5 is a plan view of the pedestal shown in FIG. 4, and FIG. 6 is a perspective view showing the state of fixing the mounting board to the pedestal shown in FIG. 4. It should be noted that the explanation will hereinafter be presented defining the upper side of FIGS. 1A and 1B as the "upper side" and the lower side thereof as the "lower side" for the sake of convenience of explanation. Further, as shown in FIGS. 1A and 1B, three axes perpendicular to each other are defined as an x axis (a first axis), a y axis (a second axis), and a z axis (a third axis), respectively. The z axis is an axis parallel to the normal direction of the pedestal 3, the x axis is an axis parallel to the extending direction of a pair of sides of the pedestal opposed to each other, the y axis is an axis parallel to the extending direction of the other pair of sides of the pedestal opposed to each other in a plan view of the pedestal. Further, the direction parallel to the x axis is defined as an "x-axis direction," the direction parallel to the y axis is defined as a "y-axis direction," and the direction parallel to the z axis is defined as a "z-axis direction." Further, the plane including the x axis and the y axis is defined as an "x-y plane," the plane including the y axis and the z axis is defined as a "y-z plane," and the plane including the z axis and the x axis is defined as a "z-x plane."

The sensor device 1 shown in FIGS. 1A and 1B is a three-axis gyro sensor device provided with angular velocity sensors 711, 712, and 713, and capable of detecting the angular velocities around the x axis, the y axis, and the z-axis perpendicular to each other. Such a sensor device 1 as described above is superior in convenience, and can preferably be used, for example, for motion trace, motion tracking, a motion controller, and pedestrian dead reckoning (PDR).

As shown in FIGS. 1A and 1B, the sensor device 1 has a mounting board 2 on which the electronic components 7 are mounted, a pedestal 3 for supporting the mounting board 2, and a lid member 8 fixed to the pedestal 3 so as to cover the mounting board 2. It should be noted that FIG. 1B is a diagram obtained by eliminating the lid member 8 from FIG. 1A.

Hereinafter, each of these members will sequentially be explained.

Mounting Board 2

The mounting board 2 is a rigid-flexible board obtained by combining rigid boards hard and difficult to be deformed, and flexible boards soft, easy to be deformed, and provided with flexibility. As such a mounting board 2 as described above, there can be used a rigid-flexible board known to the public, for example, those having hard layers such as glass epoxy boards bonded to the both sides of a flexible board, and using these parts as the rigid boards.

FIG. 2A is a plan view of the mounting board 2 in the developed state viewed from one surface side, and FIG. 2B is a plan view of the mounting board 2 in the developed state viewed from the other surface side. As shown in FIGS. 2A and 2B, the mounting board 2 is composed of a first rigid board (a mounting section) 21, a second rigid board (the mounting section) 22, a third rigid board (the mounting section) 23, a fourth rigid board (the mounting section) 24, and a fifth rigid board (the mounting section) 25 disposed away from each other, and a flexible board 26 for connecting these rigid boards.

It should be noted that hereinafter the surfaces of the rigid boards 21 through 25 shown in FIG. 2A are referred to as "obverse-side mounting surfaces," and the surfaces shown in FIG. 2B are referred to as "reverse-side mounting surfaces" for the sake of convenience of explanation.

The flexible board 26 has a first connection section 261 for connecting the first rigid board 21 and the second rigid board 22, a second connection section 262 for connecting the first rigid board 21 and the third rigid board 23, a third connection section 263 for connecting the first rigid board 21 and the fourth rigid board 24, and a fourth connection section 264 for connecting the second rigid board 22 and the fifth rigid board 25. The first connection section 261, the second connection section 262, the third connection section 263, and the fourth connection section 264 each have flexibility, and bending deformation toward the surface direction can easily be performed.

Further, edge portions (both corner portions having a diagonal relationship) of the first rigid board 21 are respectively provided with holes 21a, 21b, edge portions (both corner portions having a diagonal relationship) of the second rigid board 22 are respectively provided with holes 22a, 22b, one end portion of the third rigid board 23 is provided with a hole 23a, one end portion of the fourth rigid board 24 is provided with a hole 24a, and both end portions of the fifth rigid board 25 are respectively provided with holes 25a, 25b. These holes are holes to be used for fixing the first through fifth rigid boards 21 through 15 to the pedestal 3 with screws.

The mounting board 2 is capable of changing the posture of the rigid boards 21 through 25 by bending the connection sections 261 through 264 of the flexible board 26. Specifically, by bending the connection sections 261 through 264 so that the obverse side mounting surfaces 211 through 251 of the respective rigid boards 21 through 25 face inward, the mounting board 2 can be deformed to have a cuboid shape in which the rigid boards adjacent to each other are perpendicular to each other. In this state, the first rigid board 21 forms the lower surface, the second rigid board 22 forms the upper surface, and the third, the fourth, and the fifth rigid boards 23, 24, and 25 form the side surfaces. The mounting board 2 is fixed to the pedestal 3 in such a deformed state as described above.

As described above, by constituting the mounting board 2 with the rigid-flexible board, it is possible to easily deform the mounting board 2, and therefore, it becomes easy to fix the mounting board 2 to the pedestal 3. Further, since the rigid boards 21 through 25 are connected in a lump by the connection sections 261 through 264, also in this regard, the fixation of the mounting board 2 to the pedestal 3 can be performed easily and smoothly. Further, since a plurality of rigid boards is provided, freedom of installation of the electronic components 7 increases.

Further, by mounting the electronic components 7 on the hard rigid board, unwanted vibration of the electronic components 7 (in particular angular velocity sensors 711 through 713) can be suppressed, and thus the detection accuracy of the sensor device 1 is improved. Further, the electronic components 7 are easy to be mounted on the mounting board 2. Still further, the parallelism of the electronic components 7 can easily be achieved, and in particular, the angular velocity sensors 711 through 713 can easily be set to have desired postures, and the postures can be kept. Further, the electronic components 7 can also be mounted at high density.

Here, in the present embodiment, the first rigid board 21 has a first cutout section 21c, a second cutout section 21d, and a third cutout section 21e each opened in the edge (the outer periphery) thereof. The first cutout section 21c is formed to have a step with respect to the right side of the first rigid board 21 in FIG. 2A, and the first connection section 261 extends from the first cutout section 21c. Further, the second cutout section 21d is formed to have a step with respect to the upper side of the first rigid board 21 in FIG. 2A, and the second connection section 262 extends from the second cutout section 21d. Further, the third cutout section 21e is formed to have a step with respect to the left side of the first rigid board 21 in FIG. 2A, and the third connection section 263 extends from the third cutout section 21e.

By providing the first cutout section 21c to the first rigid board 21, it is possible to easily make the first connection section 261 have bending deformation in the vicinity of (on the first rigid board 21 side of) the connection portion with the first rigid board 21, and further, the curvature radius of the bending deformation can be kept relatively large. Further, the excessive projection of the first connection section 261 is prevented to thereby achieve downsizing of the sensor device 1. Substantially the same advantage can be obtained with respect to the second cutout section 21d and the third cutout section 21e.

Further, in the present embodiment, the second rigid board 22 has a fourth cutout section 22c, and a fifth cutout section 22d each opened in the edge (the outer periphery) thereof. The fourth cutout section 22c is formed to have a step with respect to the left side of the second rigid board 22 in FIG. 2A, and the first connection section 261 extends from the fourth cutout section 22c. Similarly, the fifth cutout section 22d is formed to have a step with respect to the lower side of the second rigid board 22 in FIG. 2A, and the fourth connection section 264 extends from the fifth cutout section 22d.

By providing the fourth cutout section 22c to the second rigid board 22, it is possible to easily make the first connection section 261 have bending deformation in the vicinity of (on the second rigid board 22 side of) the connection portion with the second rigid board 22, and further, the curvature radius of the bending deformation can be kept relatively large. Further, the excessive projection of the bent portion from the outer periphery of the second rigid board 22 is prevented to thereby achieve downsizing of the sensor device 1. Substantially the same advantage can be achieved with respect to the fifth cutout section 22d.

The mounting board 2 is hereinabove explained. It should be noted that each of the rigid boards 21 through 25, and the flexible board 26 of the mounting board 2 is provided with conductor patterns not shown, and a plurality of electronic components 7 is electrically connected in an appropriate manner via the conductor patterns.

Further, the mounting board 2 is provided with aground layer not shown, and the ground layer exerts the function of blocking the external magnetic field. Therefore, in the condition of being fixed to the pedestal 3, it is possible to eliminate the influence of the external magnetic field (external noise) from the outside of the sensor device 1 with respect to the electronic components (i.e., the electronic components 7 mounted on the obverse side mounting surfaces 211 through 251) located inside the mounting board 2.

Electronic Components 7

As shown in FIGS. 2A and 2B, on the mounting board 2, there are mounted a plurality of electronic components 7.

On the mounting board 2, there are mounted three angular velocity sensors (sensor components) 711 through 713 of a uniaxial detection type, an acceleration sensor (a sensor component) 72 of a triaxial detection type, a power supply circuit 73 for driving a variety of electronic components, an amplifier circuit 74 for amplifying the output signals from the sensor components 711 through 713, and 72, an analog/digital converter circuit 75 for converting the analog signals thus amplified by the amplifier circuit 74 into digital signals, a microcontroller 76 for performing desired control, a nonvolatile memory 77 such as an EEPROM, a direction sensor (a magnetic sensor) 78 for detecting the direction, and a connector (an interface connector) 79 for outputting signals as the electronic components 7. It should be noted that the electronic components 7 to be mounted thereon are not limited thereto, but it is possible to arbitrarily mount any components corresponding to the purpose.

Hereinafter, the arrangement of the electronic components 7 will be described in detail.

First Rigid Board 21

On the obverse side mounting surface 211 of the first rigid board 21, there are mounted the power supply circuit 73, the amplifier circuit 74, and the analog/digital converter circuit 75, and on the reverse side mounting surface 212, there are mounted the angular velocity sensor 713 and the acceleration sensor 72.

The analog/digital converter circuit 75 is larger in size than the other electronic components 7 (the power supply circuit 73 and the amplifier circuit 74) mounted on the obverse side mounting surface 211. Therefore, it is preferable to dispose the analog/digital converter circuit 75 at the center portion of the obverse side mounting surface 231. Thus, it is possible to effectively use the analog/digital converter circuit 75 as a reinforcement member for reinforcing the rigidity of the first rigid board 21. Therefore, the unwanted vibration due to the flexural deformation of the first rigid board 21 can be suppressed, the unwanted vibration can be prevented from being transmitted to the angular velocity sensors 711 through 713, and therefore the accuracy of the detection of the angular velocity by the angular velocity sensors 711 through 713 (in particular the angular velocity sensor 713 mounted on the first rigid board 21) is improved.

Further, the angular velocity sensor 713 and the acceleration sensor 72 are preferably disposed in the vicinity of the corner of the obverse side mounting surface 211. As described later, the first rigid board 21 is fixed to the pedestal 3 at the four corners via an adhesive. Therefore, it is hard for the corner sections of the first rigid board 21 to be deformed, and therefore the unwanted vibration is difficult to occur. Therefore, by disposing the angular velocity sensor 713 and the acceleration sensor 72 at such places, the angular velocity and the acceleration can more accurately be detected.

Further, by mounting the angular velocity sensor 713 and the acceleration sensor 72 on the reverse side mounting surface 212, it is possible to elongate the distance from the microcontroller 76 in the condition in which the mounting board 2 is fixed to the pedestal 3. Further, it is possible to make the ground layer of the first rigid board 21 be located between the angular velocity sensor 713 and the acceleration sensor 72, and the microcontroller 76. Therefore, it is possible to prevent the radiation noise generated from the microcontroller 76 from exerting a harmful influence on the angular velocity sensor 713 and the acceleration sensor 72 to thereby improve the detection accuracy of the angular velocity sensor 713 and the acceleration sensor 72.

Second Rigid Board 22

On the obverse side mounting surface 221 of the second rigid board 22, there is mounted the microcontroller 76, and on the reverse side mounting surface 222, there are mounted the nonvolatile memory 77 and the direction sensor 78.

The microcontroller 76 is larger in size than the other electronic components 7 (the nonvolatile memory 77 and the direction sensor 78) mounted on the second rigid board 22. Therefore, it is preferable to dispose the microcontroller 76 at the center portion of the obverse side mounting surface 221. Thus, it is possible to effectively use the microcontroller 76 as a reinforcement member for reinforcing the rigidity of the second rigid board 22. Therefore, the unwanted vibration due to the flexural deformation of the second rigid board 22 can be suppressed, and the unwanted vibration can be prevented from being transmitted to the angular velocity sensors 711 through 713, and therefore the accuracy of the detection of the angular velocity by the angular velocity sensors 711 through 713 is improved.

Further, by mounting the direction sensor 78 on the mounting surface opposite to the surface on which the microcontroller 76 is mounted, the radiation noise generated from the microcontroller 76 can be blocked by the ground layer of the second rigid board 22, and therefore, the radiation noise (the magnetic field) can effectively be prevented from reaching the direction sensor 78 and exerting a harmful influence on the direction sensor 78. Therefore, the detection accuracy of the direction sensor 78 can be improved.

Third Rigid Board 23

On the obverse side mounting surface 231 of the third rigid board 23, there is mounted the angular velocity sensor 711.

Fourth Rigid Board 24

On the obverse side mounting surface 241 of the fourth rigid board 24, there is mounted the angular velocity sensor 712.

Fifth Rigid Board 25

On the reverse side mounting surface 252 of the fifth rigid board 25, there is mounted the connector 79.

Hereinabove, the arrangement of the electronic components 7 is described in detail.

In the mounting board 2, an analog circuit composed of the power supply circuit 73, the amplifier circuit 74, the analog/digital converter circuit 75, and so on is formed on the first rigid board 21, and a digital circuit composed of the microcontroller 76, the nonvolatile memory 77, and so on is formed on the second rigid board 22. As described above, by providing the first rigid board as an analog circuit board and the second rigid board 22 as a digital circuit board to thereby form the analog circuit and the digital circuit on the respective rigid boards separated from each other, it becomes possible to effectively suppress the generation and the transmission of the noise, and thus the detection accuracy of the sensor device 1 is further improved.

The angular velocity sensors 711 through 713 are not particularly limited providing the angular velocity can be detected, and known uniaxial detection type of angular velocity sensors can be used therefor. As such angular velocity sensors 711 through 713, a sensor having a vibrator element 5 shown in FIG. 3, for example, can be used.

The vibrator element 5 is made of a quartz crystal (a piezoelectric material). Further, the vibrator element 5 has a base section 51, a pair of detecting vibrator arms 52, 53 extending in a vertical direction of the sheet of the drawing from both sides of the base section 51, a pair of connection arms 54, 55 extending in a lateral direction of the sheet from both sides of the base section 51, and pairs of driving vibrator arms 56, 57, 58, and 59 extending in the vertical direction of the sheet from both sides of the respective tip portions of the connection arms 54, 55. Further, the surface of each of the detecting vibrator arms 52, 53 is provided with a detecting electrode (not shown), and the surface of each of the driving vibrator arms 56, 57, 58, and 59 is provided with a driving electrode (not shown).

In such a vibrator element 5, in the condition in which the driving vibrator arms 56, 58 and the driving vibrator arms 57, 59 are made to vibrate by applying a voltage to driving electrodes so as to repeat to come closer to and get away from each other, when the angular velocity w around the normal line A (a detection axis A) of the vibrator element 5 is applied, the Coriolis force is applied to the vibrator element 5, and the vibration of the detecting vibrator arms 52, 53 is excited. Then, by detecting the distortion in the detecting vibrator arms 52, 53, which is caused by the vibration of the detecting vibrator arms 52, 53, by the detecting electrodes, the angular velocity applied to the vibrator element 5 can be obtained.

The angular velocity sensors 711 through 713 each having the configuration described above are mounted on the corresponding rigid boards so that the thickness direction of the rigid board corresponds to the detection axis.

Pedestal 3

As shown in FIGS. 4, 5 and 6, the pedestal 3 has a plate like base section 31, and a first support section 32, a second support section 33, a third support section 34, a fourth support section 35, and a fifth support section 36 provided to the base section 31. The pedestal 3 will hereinafter be explained based on FIGS. 4 through 6, and in FIG. 6, some members are omitted from the drawing for the sake of convenience of explanation.

Base Section

The base section 31 has the thickness direction aligned in the z-axis direction, and has a lower surface and an upper surface 312 parallel to the x-y plane defined by the x axis and the y axis. Further, the base section 31 has a recessed section 313 opened in the upper surface 312. The recessed section 313 is opened in the center portion of the upper surface 312 except the edge portion thereof, and is not opened in the side surface of the base section 31. In other words, the recessed section 313 has a trough shape surrounded by sidewalls in the periphery thereof.

Such a recessed section 313 as described above functions as a housing section for housing the angular velocity sensor 713 and the acceleration sensor 72 mounted on the reverse side mounting surface 212 of the first rigid board 21 in the condition of fixing the mounting board 2 to the pedestal 3. In other words, the recessed section 313 forms a clearance for preventing the angular velocity sensor 713 and the acceleration sensor 72 from having contact with the pedestal 3. By forming such a recessed section 313, the space of the pedestal 3 can be used effectively to thereby achieve downsizing (low-profiling, reduction in height) of the sensor device 1.

First Support Section

As shown in FIG. 5, the first support section 32 has four fixation surfaces 321, 322, 323, and 324 disposed in the periphery of the recessed section 313. The four fixation surfaces 321 through 324 are surfaces for fixing the first rigid board 21 to the pedestal 3 while performing positioning of the first rigid board 21 with respect to the pedestal 3.

Specifically, the fixation surfaces 321 through 324 have a function of positioning the first rigid board 21 with respect to the pedestal 3 so that the detection axis of the angular velocity sensor 713 becomes parallel to the z axis, and then fixing it.

The fixation surfaces (first fixation surfaces) 321 through 324 are formed in the periphery of the recessed section 313 so as to correspond to the four corners of the first rigid board 21. Such fixation surfaces 321 through 324 are each constituted by the upper surface 312. As described above, by using the upper surface 312 as the fixation surfaces 321 through 324, it is possible to form the first support section 32 with ease and accuracy.

Since the fixation surfaces 321 through 324 are located on the same plane parallel to the x-y plane, if the first rigid board 21 is mounted on the fixation surfaces 321 through 324 as shown in FIG. 6, the detection axis A1 of the angular velocity sensor 713 becomes parallel to the z axis. As described above, only by mounting the first rigid board 21 on the fixation surfaces 321 through 324, the positioning (the axis alignment of the detection axis A1) of the angular velocity sensor 713 with respect to the pedestal 3 can be performed with ease and accuracy.

It should be noted that the method of fixing the first rigid board 21 to the fixation surfaces 321 through 324 is not particularly limited, and in the present embodiment, both of fixation with an adhesive and fixation with screws are used together. Specifically, each of the fixation surfaces 321 through 324 and the first rigid board 21 are firstly fixed to each other with an adhesive. Since the holes 21a, 21b provided to the first rigid board 21 are located on the fixation surfaces 321, 323 in this state, the first rigid board 21 is fixed to the fixation surfaces 321, 323 (the base section 31) with screws via the holes 21a, 21b. Thus, the fixation of the first rigid board 21 to the first support section 32 can surely be performed. Further, since the layer of the adhesive intervenes between the pedestal 3 and the first rigid board 21, the adhesive absorbs and eases the vibration transmitted from the pedestal 3 to thereby suppress the unwanted vibration of the first rigid board 21. As a result, the detection accuracy of the sensor device 1 is further improved.

It should be noted that the recessed section 313 is filled with an infill not shown, and the gap between the pedestal 3 and the first rigid board 21 is filled with the infill. Thus, the first rigid board 21 (the angular velocity sensor 713, the acceleration sensor 72) and the connection sections 261, 262, and 263 extending from the first rigid board 21 are fixed to thereby effectively prevent the unwanted vibration from occurring in the first rigid board 21. Therefore, the detection accuracy of the sensor device 1 is improved.

As the constituent material of the infill, those having an insulating property are preferable. The material is not particularly limited, and there can be cited as the material, for example, polyolefin such as polyethylene, or polypropylene, ethylene-propylene copolymer, polyvinyl chloride, polystyrene, polyamide, polyimide, polycarbonate, poly-(4-methylpentene-1), ionomer, acrylic resin, polymethylmethacrylate, acrylonitrile-butadiene-styrene copolymer (ABS resin), acrylonitrile-styrene copolymer (AS resin), butadiene-styrene copolymer, polyester such as polyethylene terephthalate (PET), or polybutylene terephthalate (PBT), polyether, polyetherketone (PEK), polyether ether ketone (PEEK), polyetherimide, polyacetal (POM), polyphenylene oxide, polysulfone, polyethersulfone, polyphenylene sulfide, polyarylate, aromatic polyester (liquid crystal polymer), fluorinated resin such as polytetrafluoroethylene or polyvinylidene fluoride, epoxy resin, phenol resin, urea resin, melamine resin, silicone resin, polyurethane resin, and so on, copolymers, polymer blends, and polymer alloys having any one of these compounds as the primary constituent, and these materials can be used alone or in combination.

Second Support Section

As shown in FIG. 5, the second support section 33 is a region for fixing the third rigid board 23 to the pedestal 3 while performing positioning of the third rigid board 23 with respect to the pedestal 3. Specifically, the second support section 33 has a function of positioning the third rigid board 23 with respect to the pedestal 3 so that the detection axis of the angular velocity sensor 712 becomes parallel to the x axis, and then fixing it.

Such a second support section 33 projects from the upper surface of the base section 31, and has a pair of projecting sections 41, 42 disposed apart from each other in the y-axis direction, and a space 61 formed in between. The projecting sections 41, 42 are respectively provided with surfaces (third fixation surfaces) 411, 421 disposed on the outer periphery of the pedestal 3 and parallel to the y-z plane. Further, these surfaces 411, 421 are disposed coplanar with each other. Further, these surfaces 411, 421 function as fixation surfaces (hereinafter referred to as a "fixation surface 411" and a "fixation surface 421," respectively) for fixing the third rigid board 23.

Since the fixation surfaces 411, 421 are located on the same plane parallel to the y-z plane, if the third rigid board 23 is fixed to the fixation surfaces 411, 421 as shown in FIG. 6, the detection axis of the angular velocity sensor 711 becomes parallel to the x axis. In other words, only by fixing the third rigid board 23 to the fixation surfaces 411, 421, the positioning (the axis alignment of the detection axis) of the angular velocity sensor 711 with respect to the pedestal 3 can be performed with ease and accuracy.

The method of fixing the third rigid board 23 to the fixation surfaces 411, 421 is not particularly limited, and in the present embodiment, both of fixation with an adhesive and fixation with a screw are used together. Specifically, each of the fixation surfaces 411, 421 and the third rigid board 23 are firstly fixed to each other with an adhesive. Since the hole 23a provided to the third rigid board 23 is located on the fixation surface 411 in this state, the third rigid board 23 is fixed to the projecting section 41 with a screw via the holes 23a. Thus, the fixation of the third rigid board 23 to the second support section 33 can surely be performed. Further, since the layer of the adhesive intervenes between the pedestal 3 and the third rigid board 23, the adhesive absorbs and eases the vibration transmitted from the pedestal 3 to thereby suppress the unwanted vibration of the third rigid board 23. As a result, the detection accuracy of the sensor device 1 is further improved.

In the state in which the third rigid board 23 is fixed to the fixation surfaces 411, 421, the angular velocity sensor 711 is located in the space 61 between the pair of projecting sections 41, 42. Therefore, it can be said that the space 61 forms a clearance (hereinafter referred to as a "clearance 61") for preventing the pedestal 3 and the angular velocity sensor 711 from having contact with each other. By forming the clearance 61 described above, it is possible to prevent breakage of the angular velocity sensor 711, and at the same time achieve downsizing of the sensor device 1.

Further, the clearance 61 is communicated with the space in the recessed section 313, and the recessed section 313 has an area 313a projecting toward the outside of the pedestal 3 from the fixation surfaces 411, 421 in the x-y plan view. By adopting such a configuration, it is possible to dispose the second connection section 262 for connecting the first rigid board 21 and the third rigid board 23 inside the clearance 61 and the area 313a without making an excessive deformation. Therefore, the breakage of the mounting board 2 due to the excessive deformation can effectively be prevented, and thus the reliability of the sensor device 1 is enhanced.

Further, in the state in which the third rigid board 23 is fixed to the fixation surfaces 411, 421, the angular velocity sensor 711 is located on the inner side of the third rigid board 23. Therefore, in the case of, for example, manufacturing the sensor device 1, contact between the angular velocity sensor 711 and the operator, manufacturing equipment, or the like is prevented, and thus the breakage of the angular velocity sensor 711 can effectively be prevented. Further, as described above, since it is possible to block the external magnetic field using the ground layer provided to the mounting board 2, the detection accuracy of the angular velocity sensor 711 is improved.

Third Support Section

The third support section 34 is a region for fixing the fourth rigid board 24 to the pedestal 3 while performing positioning of the fourth rigid board 24 with respect to the pedestal 3. Specifically, the third support section 34 has a function of positioning the fourth rigid board 24 with respect to the pedestal 3 so that the detection axis of the angular velocity sensor 712 becomes parallel to the y axis, and then fixing it.

Such a third support section 34 projects from the upper surface of the base section 31, and has a pair of projecting sections 42, 43 disposed apart from each other in the x-axis direction, and a space 62 formed in between. The projecting sections 42, 43 are respectively provided with surfaces (second fixation surfaces) 422, 431 disposed on the outer periphery of the pedestal 3 and parallel to the z-x plane. Further, these surfaces 422, 431 are disposed coplanar with each other. Further, these surfaces 422, 431 function as fixation surfaces (hereinafter referred to as a "fixation surface 422" and a "fixation surface 431," respectively) for fixing the fourth rigid board 24.

Since the fixation surfaces 422, 431 are located on the same plane parallel to the z-x plane, if the fourth rigid board 24 is fixed to the fixation surfaces 422, 431 as shown in FIG. 6, the detection axis of the angular velocity sensor 712 becomes parallel to the y axis. In other words, only by fixing the fourth rigid board 24 to the fixation surfaces 422, 431, the positioning (the axis alignment of the detection axis) of the angular velocity sensor 712 with respect to the pedestal 3 can be performed with ease and accuracy.

The method of fixing the fourth rigid board 24 to the fixation surfaces 422, 431 is not particularly limited, and in the present embodiment, both of fixation with an adhesive and fixation with a screw are used together. Specifically, each of the fixation surfaces 422, 431 and the fourth rigid board 24 are firstly fixed to each other with an adhesive. Since the hole 24a provided to the fourth rigid board 24 is located on the fixation surface 422 in this state, the fourth rigid board 24 is fixed to the projecting section 42 with a screw via the holes 24a. Thus, the fixation of the fourth rigid board 24 to the third support section 34 can surely be performed. Further, since the layer of the adhesive intervenes between the pedestal 3 and the fourth rigid board 24, the adhesive absorbs and eases the vibration transmitted from the pedestal 3 to thereby suppress the unwanted vibration of the fourth rigid board 24. As a result, the detection accuracy of the sensor device 1 is further improved.

In the state in which the fourth rigid board 24 is fixed to the fixation surfaces 422, 431, the angular velocity sensor 712 is located in the space 62 between the pair of projecting sections 42, 43. Therefore, it can be said that the space 62 forms a clearance (hereinafter referred to as a "clearance 62") for preventing the pedestal 3 and the angular velocity sensor 712 from having contact with each other. By forming the clearance 62 described above, it is possible to prevent breakage of the angular velocity sensor 712, and at the same time achieve downsizing of the sensor device 1.

Further, the clearance 62 is communicated with the space in the recessed section 313, and the recessed section 313 has an area 313b projecting toward the outside of the pedestal 3 from the fixation surfaces 422, 431 in the x-y plan view. By adopting such a configuration, it is possible to dispose the third connection section 263 for connecting the first rigid board 21 and the fourth rigid board 24 inside the clearance 62 and the area 313b without making an excessive deformation. Therefore, the breakage of the mounting board 2 due to the excessive deformation can effectively be prevented, and thus the reliability of the sensor device 1 is enhanced.

Further, in the state in which the fourth rigid board 24 is fixed to the fixation surfaces 422, 431, the angular velocity sensor 712 is located on the inner side of the fourth rigid board 24. Therefore, in the case of, for example, manufacturing the sensor device 1, contact between the angular velocity sensor 712 and the operator, manufacturing equipment, or the like is prevented, and thus the breakage of the angular velocity sensor 712 can effectively be prevented. Further, as described above, since it is possible to block the external magnetic field using the ground layer provided to the mounting board 2, the detection accuracy of the angular velocity sensor 712 is improved.

Fourth Support Section

The fourth support section 35 is a region for fixing the second rigid board 22 to the pedestal 3 so as to be opposed to the first rigid board 21 in the z-axis direction. By fixing the second rigid board 22 so as to overlap the first rigid board 21, downsizing (in particular, downsizing in the x-y plan view) of the sensor device 1 can be achieved.

It should be noted that since no such a physical quantity sensor as the angular velocity sensors 711 through 713 or the acceleration sensor 72 is mounted on the second rigid board 22, such accuracy of positioning as required to the first through third support sections 32 through 34 described above is not required to the fourth support section 35. It should be noted that from the viewpoint of downsizing (low-profiling, reduction in height) of the sensor device 1, it is preferable that the fourth support section 35 is configured so as to support and fix the second rigid board 22 in parallel to the first rigid board 21.

Such a fourth support section 35 as described above has four projecting sections 41, 42, 43, and 44 projecting from the upper surface of the base section 31. The projecting sections 41 through 44 are located so as to correspond to the four corners of the second rigid board 22. The upper surfaces 413, 423, 433, and 443 of the four projecting sections 41, 42, 43, and 44 are surfaces (fourth fixation surfaces) parallel to the x-y plane, and are disposed on the same plane. Further, these four upper surfaces 413 through 443 function as fixation surfaces (hereinafter referred to as a "fixation surface 413," a "fixation surface 423," a "fixation surface 433," and a "fixation surface 443," respectively) for fixing the second rigid board 22.

Since the fixation surfaces 413 through 443 are located on the same plane parallel to the x-y plane, if the second rigid board 22 is fixed to the fixation surfaces 413 through 443 as shown in FIG. 1B, the second rigid board 22 becomes opposed to the first rigid board 21 in the z-axis direction, and at the same time becomes parallel to the x-y plane. Thus, the downsizing of the sensor device 1 can be achieved.

The method of fixing the second rigid board 22 to the fixation surfaces 413 through 443 is not particularly limited, and in the present embodiment, both of fixation with an adhesive and fixation with screws are used together. Specifically, each of the fixation surfaces 413 through 443 and the second rigid board 22 are firstly fixed to each other with an adhesive. Since the holes 22a, 22b provided to the second rigid board 22 are located on the fixation surfaces 413, 433 in this state, the second rigid board 22 is fixed to the projecting sections 41, 43 with screws via the holes 22a, 22b, respectively. Thus, the fixation of the second rigid board 22 to the fourth support section 35 can surely be performed.

Fifth Support Section

The fifth support section 36 is a region for fixing the fifth rigid board 25. It should be noted that no such a physical quantity sensor as the angular velocity sensors 711 through 713 or the acceleration sensor 72 is mounted on the fifth rigid board 25. Therefore, similarly to the fourth support section 35 described above, such accuracy of positioning as required to the first through third support sections 32 through 34 described above is not required to the fifth support section 36. It should be noted that from the viewpoint of downsizing of the sensor device 1, it is preferable that the fifth support section 36 is configured so as to support the fifth rigid board 25 in parallel to the y-z plane.

Such a fifth support section 36 as described above has a projecting section 45 projecting from the upper surface of the base section 31. The projecting section 45 is disposed so as to be opposed to the second support section 33 via the recessed section 313, and extends in the y-axis direction. The projecting section 45 described above is provided with a surface 451 disposed on the outer periphery of the pedestal 3, and parallel to the y-z plane, and the surface 451 functions as a fixation surface (hereinafter referred to as a "fixation surface 451") for fixing the fifth rigid board 25. As shown in FIG. 6, when fixing the fifth rigid board 25 to such a fixation surface 451 as described above, the fifth rigid board 25 becomes parallel to the y-z plane. Thus, the downsizing of the sensor device 1 can be achieved.

The method of fixing the fifth rigid board 25 to the fixation surface 451 is not particularly limited, and in the present embodiment, both of fixation with an adhesive and fixation with screws are used together. Specifically, the fixation surface 451 and the fifth rigid board 25 are firstly fixed to each other with an adhesive. Since the holes 25a, 25b provided to the fifth rigid board 25 are located on the fixation surface 451 in this state, the fifth rigid board 25 is fixed to the projecting section 45 with screws via the holes 25a, 25b. Thus, the fixation of the fifth rigid board 25 to the fifth support section 36 can surely be performed.

Hereinabove, the first through fifth support sections 32 through 36 are explained.

The pedestal 3 further has projecting sections 46, 47 projecting from two corner sections of the base section 31 having a diagonal relationship. The projecting section 46 is larger in lateral cross-sectional area than the projecting section 41, and is formed integrally with the projecting section 41. Thus, the mechanical strength of the projecting section 41 is enhanced. On the other hand, the projecting section 47 is larger in lateral cross-sectional area than the projecting section 43, and is formed integrally with the projecting section 43. Thus, the mechanical strength of the projecting section 43 is enhanced. Further, the projecting section 47 is formed integrally also with the projecting sections 44, 45, and thus the mechanical strength of each of the projecting sections 44, 45 is enhanced. As described above, by providing the projecting sections 46, 47, the mechanical strength of each of the projecting sections 41 through 45 provided to the first through fifth support sections 32 through 36 can be enhanced to thereby surely fix the mounting board 2 with a desired posture.

Although the constituent material of such a pedestal 3 is not particularly limited, a material with a damping property is preferably used. Thus, the unwanted vibration of the mounting board 2 can be suppressed to thereby improve the detection accuracy of the sensor device 1. The material described above is not particularly limited, and there can be cited various types of damping alloys such as a magnesium alloy, an iron alloy, a copper alloy, a manganese alloy, and a Ni—Ti alloy.

According to such a pedestal 3 as described above, only by fixing the mounting board 2 to the predetermined position, the detection axes of the angular velocity sensors 711, 712, and 713 can be set to be parallel to the x axis, the y axis, and the z axis, respectively. Therefore, the sensor device 1 capable of exerting excellent detection accuracy can easily be obtained.

Further, when mounting the sensor device 1 on the circuit board (a target object) such as a motherboard, by using the two side surfaces 3a, 3b of the pedestal 3 perpendicular to each other as the reference, it is possible to easily point the detection axes of the angular velocity sensors 711, 712 to the desired directions. Specifically, the side surface 3a is a surface parallel to the detection axis of the angular velocity sensor 712, and the side surface 3b is a surface parallel to the detection axis of the angular velocity sensor 711. Therefore, by performing the positioning with respect to the circuit board using the side surfaces 3a, 3b as the reference, it is possible to point the detection axes of the angular velocity sensors 711, 712 to the desired directions with ease and accuracy.

Lid Member

The lid member 8 is fixed to the pedestal 3 so as to cover the mounting board 2. Thus, the electronic components 7 can be protected. Further, the side surface of the lid member 8 is provided with an opening, and in the state in which the lid member 8 is fixed to the pedestal 3, the connector 79 is exposed to the outside through the opening. Thus, the electrical connection between the external equipment and the connector 79 can easily be achieved. The method of fixing the pedestal 3 and the lid member 8 to each other is not particularly limited, and fitting, screwing, and bonding with an adhesive can be used.

The constituent material of such a lid member is not particularly limited, and there can be cited as the material, for example, polyolefin such as polyethylene, or polypropylene, ethylene-propylene copolymer, polyvinyl chloride, polystyrene, polyamide, polyimide, polycarbonate, poly-(4-methylpentene-1), ionomer, acrylic resin, polymethylmethacrylate, acrylonitrile-butadiene-styrene copolymer (ABS resin), acrylonitrile-styrene copolymer (AS resin), butadiene-styrene copolymer, polyester such as polyethylene terephthalate (PET), or polybutylene terephthalate (PBT), polyether, polyetherketone (PEK), polyether ether ketone (PEEK), polyetherimide, polyacetal (POM), polyphenylene oxide, polysulfone, polyethersulfone, polyphenylene sulfide, polyarylate, aromatic polyester (liquid crystal polymer), fluorinated resin such as polytetrafluoroethylene or polyvinylidene fluoride, epoxy resin, phenol resin, urea resin, melamine resin, silicone resin, polyurethane resin, and so on, copolymers, polymer blends, and polymer alloys having any one of these compounds as the primary constituent, and these materials can be used alone or in combination.

2. Electronic Apparatus

Figure 7:
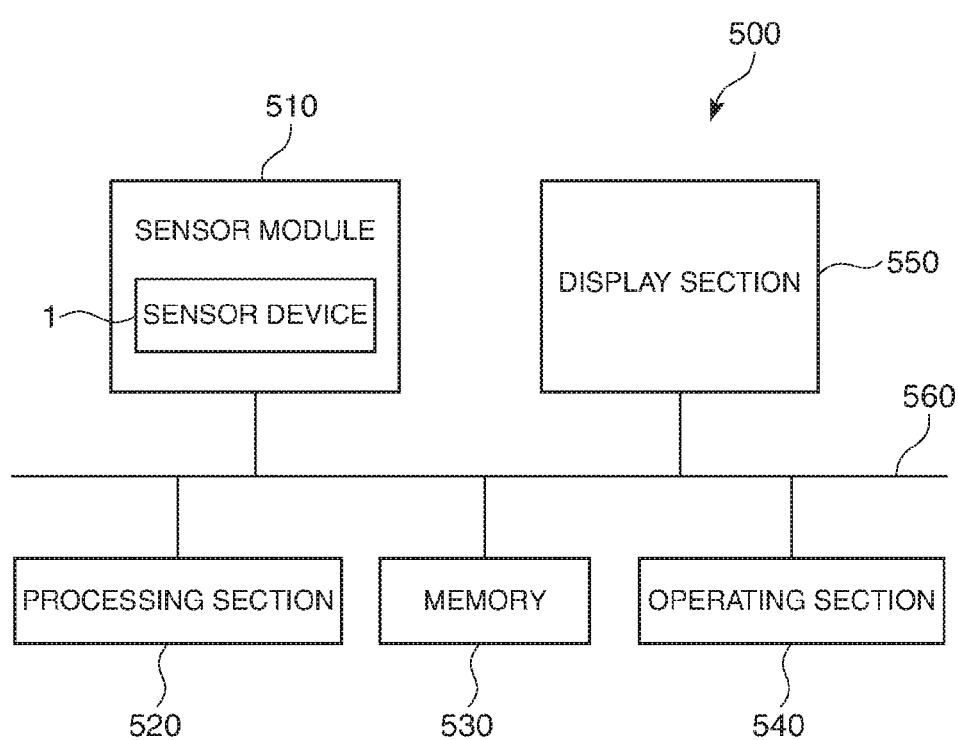
FIG. 7 is a diagram showing an example of a configuration of an electronic apparatus equipped with the sensor device according to the invention.

The sensor device 1 described above can be incorporated in a variety of electronic apparatuses. The electronic apparatus according to an embodiment of the invention equipped with the sensor device 1 will hereinafter be described. FIG. 7 is a diagram showing an example of a configuration of an electronic apparatus 500 equipped with the sensor device 1. The electronic apparatus 500 is not particularly limited, there can be cited as the electronic apparatus, for example, a digital camera, a video camera, a car navigation system, a cellular phone, a mobile PC, a robot, a gaming machine, and a gaming controller.

The electronic apparatus 500 shown in FIG. 7 has a sensor module 510 including the sensor device 1, a processing section 520, a memory 530, an operating section 540, and a display section 550. These constituents are connected to each other via a bus 560. The processing section (e.g., a CPU and MPU) 520 performs the control of the sensor module 510 and so on and the overall control of the electronic apparatus 500. Further, the processing section 520 performs the process based on the angular velocity information detected by the sensor module 510. For example, the processing section 520 performs the process for blurring correction, posture control, and GPS autonomous navigation based on the angular velocity information. The memory 530 stores the control program and a variety of data, and further, functions as a working area and a data storage area. The operating section 540 is for the user to operate the electronic apparatus 500. The display section 550 is for displaying a variety of information to the user.

Although the sensor device and the electronic apparatus according to the invention are hereinabove described based on the embodiments shown in the accompanying drawings, the present invention is not limited thereto, but the configuration of each of the constituents can be replaced with one having an arbitrary configuration with an equivalent function.

Further, although in the embodiment described above there is explained the configuration of mounting the three angular velocity sensors on the mounting board, the number of angular velocity sensors is not limited thereto, and can be one or two. Further, the number of rigid boards can also be changed in accordance with the number of angular velocity sensors.

Further, although in the embodiment described above the mounting board is formed of the rigid-flexible board, the configuration of the mounting board is not limited thereto, and it is also possible to configure the mounting board with a plurality of rigid boards not connected to each other. In this case, it is possible to electrically connect the rigid boards to each other using connectors and so on after fixing the rigid boards to the pedestal.

What is claimed is:

1. A sensor device comprising:
   a mounting board having a plurality of mounting sections, wherein at least one of a plurality of sensor components is mounted on at least one of the plurality of mounting sections; and
   a pedestal adapted to fix each of the mounting sections, wherein when three axes perpendicular to each other are defined as a first axis, a second axis, and a third axis, respectively,
   the pedestal includes
     a base section having a first fixation surface along the first axis and the second axis, and
     a projecting section disposed on the base section, and having a second fixation surface along the third axis and the first axis, and a third fixation surface along the second axis and the third axis,
     each of the mounting sections is supported by at least two of the first fixation surface, the second fixation surface, and the third fixation surface, and
     the plurality of sensor components have respective detection axes intersecting with each other.

2. The sensor device according to claim 1, wherein
   at least one pair of the projecting sections are provided, and
   at least one of the mounting sections is supported by the pair of the projecting sections so that the at least one sensor component is located between the pair of the projecting sections.

3. The sensor device according to claim 1, wherein
   the base section is provided with a recessed section on the surface along the first axis and the second axis.

4. The sensor device according to claim 3, wherein
   the first fixation surface is disposed on a periphery of the recessed section.

5. The sensor device according to claim 3, wherein
   supported by the first fixation surface is supported so that a surface on which the at least one sensor component is mounted faces to the recessed section.

6. The sensor device according to claim 3, wherein
   the recessed section is filled with an infill.

7. The sensor device according to claim 1, wherein
   the projecting section is located above the first fixation surface, and has a fourth fixation surface including the first axis and the second axis.

8. The sensor device according to claim 7, wherein
   the plurality of mounting sections includes
     an analog circuit board having an analog circuit, and
     a digital circuit board having a digital circuit, and
   the analog circuit board is supported by one of the first fixation surface and the fourth fixation surface, and
   the digital circuit board is supported by the other of the first fixation surface and the fourth fixation surface.

9. The sensor device according to claim 1, wherein the plurality of mounting sections are respectively connected by bendable connection sections.

10. The sensor device according to claim 1, wherein the plurality of sensor components include at least one of an angular velocity sensor and an acceleration sensor.

11. An electronic apparatus comprising:
or device according to claim 1.

* * * * *